United States Patent [19]

Yamada

[11] Patent Number: 5,418,435
[45] Date of Patent: May 23, 1995

[54] LIGHT CONTROLLER WITH OVERLOAD CURRENT PROTECTION CIRCUIT

[75] Inventor: Tatsuya Yamada, Sendai, Japan

[73] Assignee: Alps Electric Co., Ltd., Tokyo, Japan

[21] Appl. No.: 185,662

[22] Filed: Jan. 21, 1994

[30] Foreign Application Priority Data

Feb. 1, 1993 [JP] Japan .................. 5-002255 U

[51] Int. Cl.6 ............................................ H05B 37/02
[52] U.S. Cl. ................................. 315/308; 315/209 R;
315/291; 315/307; 315/309; 315/91
[58] Field of Search .................... 315/209 R, 291, 307,
315/308, 91, 149, 309,

[56] References Cited

U.S. PATENT DOCUMENTS 4,935,641  6/1990  Wilhelm .......................... 307/10.8
5,332,951  7/1994  Turner et al. ................... 315/209 R Primary Examiner—Robert J. Pascal
Assistant Examiner—Reginald A. Ratliff
Attorney, Agent, or Firm—Guy W. Shoup; Patrick T. Bever

[57] ABSTRACT

The invention provides a light controller for lamps which can reduce the number of parts, cost and size. A rectangular wave voltage output from an astable multivibrator (1) is inverted by an inverter (3) and then supplied to a gate of a P-channel MOS FET (5) for on/off driving the MOS FET (5). A current is thereby caused to flow through a lamp (7) for lighting it up. By changing a resistance value of a variable resistor (2), a cycle of the rectangular wave voltage is changed and, therefore, an amount of the current flowing through the lamp (7) is changed so as to vary the illumination intensity of the lamp.

7 Claims, 4 Drawing Sheets

LIGHT CONTROLLER WITH OVERLOAD CURRENT PROTECTION CIRCUIT

BACKGROUND OF THE INVENTION

1. Field of the Invention

The present invention relates to a lamp light controller for controlling, by way of example, a dashboard illumination lamp in motor vehicles.

2. Description of the Related Art

As a light control let for a dashboard illumination lamp, there is known one of the type that a PWM (Pulse Width Modulated) wave is used as a lamp driving current, and a duty ratio of the PWM wave is adjustable by a user for changing the illumination intensity of the lamp.

FIG. 4 shows a schematic configuration of such a light controller for lamps.

In FIG. 4, a PWM controller 100 generates a PWM wave which is boosted in its amplitude by a charge pump circuit (doubler circuit) 300 and then supplied to an N-channel MOS FET 400. The MOS FET 400 is turned on and off in accordance with the PWM wave supplied thereto, whereby a driving current is intermittently supplied to a lamp 500 for lighting it up.

The intensity of light emitted from the lamp 500 depends on a duty ratio of the driving current intermittently supplied. The PWM controller 100 includes a variable resistor 200 which can be operated by a user. By changing a resistance value of the variable resistor 200, the duty ratio of the PWM wave output from the PWM controller 100 is changed. Accordingly, upon the user operating the variable resistor 200, the duty ratio of the driving current for the lamp 500 can be changed to vary the illumination intensity of the lamp 500.

FIG. 5 is a circuit diagram showing a practical configuration of the light controller for lamps shown in FIG. 4.

In FIG. 5, a comparator 101, a capacitor 102, a diode 105 and resistances 103, 104 jointly serve as a ring oscillator, as a triangular wave oscillator 100A, which cooperates with a comparator 105 to constitute the PWM controller 100 (FIG. 4). In response to an output level of the comparator 101 being alternately changed to "H" (high level) and "L" (low level), the capacitor 102 is charged and discharged to thereby produce a triangular wave A. This triangular wave A is applied to a non-inverting input of the comparator 106, whereas a reference voltage B obtained from the variable resistor 200 is applied to an inverting input of the comparator 106. The variable resistor 200 comprises a fixed resistance 201, a rotary switch 202, and a resistance 203 providing a resistance value depending on a position of the rotary switch 202. A voltage resulted from the resistances 201, 203 dividing a source voltage+Vcc becomes the reference voltage B. The comparator 106 produces a PWM wave C which takes "H" when level of the triangular wave A≧reference voltage B, and "L" when level of the triangular wave A<reference voltage B.

When the rotary switch 202 is operated to change the resistance value of the resistance 203, the reference voltage B is changed, whereupon a duty ratio of the PWM wave C produced from the comparator 106 is varied.

During an "L" period of the PWM wave C produced from the comparator 106, a gate potential of the MOS FET 400 is lower than its drain potential and the MOS FET 400 is not turned on. In order to effect that the MOS FET 400 is turned on during an "H" period of the PWM wave C, the gate potential of the MOS FET 400 must be higher than the drain potential. The doubler circuit 300 is required to raise the "H" level of the PWM wave C so as to meet such a condition.

The doubler circuit 300 comprises a diode 309, a capacitor 302, and resistances 303, 304. When an output of the comparator 101 in the triangular wave oscillator 100A takes "L", the capacitor 302 is charged to+Vcc through the diode 309. At this time, the capacitor 102 in the triangular wave oscillator 100A is abruptly discharged through the diode 105 and the resistance 103, but this discharging is not so abrupt as to impede the charging of the capacitor 302 in the doubler circuit 300. When the output of the comparator 101 in the triangular wave oscillator 100A takes "H", a charged voltage of the capacitor 102 is raised to make the PWM wave C from the comparator 106 become "H". Added to a potential at this "H" of the PWM wave C is a charged voltage of the capacitor 302 through the resistance 303 so that the gate potential of the MOS FET 400 is raised to exceed the drain potential. Accordingly, the MOS FET 400 is turned on.

In such an arrangement, by operating the rotary switch 202 to change the reference voltage B, a duty ratio of the PWM wave C produced from the comparator 106 is changed and hence so is an on/off duty ratio of the MOS FET 400. As a result, the illumination intensity of the lamp 500 shown in FIG. 2 is varied.

In the above-mentioned related art, the doubler circuit 300 is required to effect on/off driving of the MOS FET. More specifically, a voltage applied to the illumination lamp 500 attached in dashboards of motor vehicles is 12 (v) and this voltage gives the drain potential of the N-channel MOS FET 400. Therefore, the source voltage+Vcc is set to 12 (v). To turn on the MOS FET 400, the gate potential must be made sufficiently higher than the drain potential. But since the comparator 106 is driven with the source voltage +Vcc, the resulting potential at "H" of the PWM wave C is +Vcc at maximum. Thus, if only the potential at "H" of the PWM wave C is simply applied to the gate of the MOS FET 400, the MOS FET 400 would not be turned on. For that reason, the doubler circuit 300 is provided to increase the voltage at "H" of the PWM wave C about twice the source voltage.

However, the doubler circuit 300 has accompanied problems of requiring a large physical space and increasing an size of the whole controller. Also, adding the doubler circuit 300 has increased the number of parts and the production cost.

Further, the above-mentioned related art requires comparators as essentials; i.e., the comparator 101 in the triangular wave oscillator 100A and the comparator 106 for generating the PWM wave. The fact that these comparators are each of a complicated circuit comprising many parts has also increased the number of parts, cost and size of the conventional controller.

Additionally, in the case where head lamps of motor vehicles are automatically lit up and off by detecting brightness in the surroundings, a switch is required for turning on and off a dashboard illumination lamp or the like upon switching of the head lamps at the same time.

SUMMARY OF THE INVENTION

An object of the present invention is to provide a light controller for lamps which can reduce the number of parts, cost and size.

Another object of the present invention is to provide a light controller for lamps which operates reliably and safely.

Still another object of the present invention is to provide a light controller for lamps which does not require switch means for lighting up and off a dashboard illumination lamp or the like and hence can obviate a specific operation necessary for lighting up and off the lamp.

To achieve the above objects, according to one aspect of the present invention, a light controller for lamps comprises a multivibrator provided with means for making its oscillation frequency variable, and a P-channel MOS FET on/off driven with a rectangular wave voltage output from the multivibrator, whereby a current is supplied to a lamp through the MOS FET.

According to another aspect of the present invention, a light controller for lamps comprises a multivibrator provided with means for making its oscillation frequency variable, an inverter for inverting a rectangular wave voltage output from the multivibrator, and a P-channel MOS FET to a gate of which the rectangular wave voltage output from the inverter is applied, the MOS FET having a source to which a source voltage is applied and a drain to which a lamp is connected, the MOS FET being on/off controlled with the rectangular wave voltage.

According to still another aspect of the present invention, a light controller for lamps comprises a multivibrator provided with means for making its oscillation frequency variable, an inverter for inverting a rectangular wave voltage output from the multivibrator, a P-channel MOS FET to a gate of which the rectangular wave voltage output from the inverter is applied, and a protective circuit connected in parallel to the MOS FET for protecting the MOS FET against an overload current, the MOS FET having a source to which a source voltage is applied and a drain to which a lamp is connected, the MOS FET being on/off controlled with the rectangular wave voltage.

According to still another aspect of the present invention, a light controller for lamps comprises a multivibrator provided with means for making its oscillation frequency variable, an inverter for inverting a rectangular wave voltage output from the multivibrator, a P-channel MOS FET to a gate of which the rectangular wave voltage output from the inverter is applied, a source voltage applied to a source of the MOS FET, and a lamp connected to a drain of the MOS FET, the MOS FET being on/off controlled with the rectangular wave voltage.

According to still another aspect of the present invention, a light controller for lamps comprises a multivibrator provided with means for making its oscillation frequency variable, a P-channel MOS FET to a gate of which a rectangular wave voltage output from the multivibrator is applied, a protective circuit connected in parallel to the MOS FET for protecting the MOS FET against an overload current, a source voltage applied to a source of the MOS FET, a lamp connected to a drain of the MOS FET, and a driver circuit connected to the output side of the multivibrator for controlling driving and stop of the multivibrator, the MOS FET being on/off control led with the rectangular wave voltage.

According to still another aspect of the present invention, a light controller for lamps comprises a multivibrator provided with means for making its oscillation frequency variable, an inverter for inverting a rectangular wave voltage output from the multivibrator, a P-channel MOS FET to a gate of which the rectangular wave voltage output from the inverter is applied, a protective circuit connected in parallel to the MOS FET for protecting the MOS FET against an overload current, a source voltage applied to a source of the MOS FET, and a lamp connected to a drain of the MOS FET, whereby the MOS FET is on/off controlled with the rectangular wave voltage.

By changing the oscillation frequency of the multivibrator, an on/off repetition cycle of the MOS FET is changed and, therefore, an amount of the current flowing through the lamp is changed so as to vary the illumination intensity of the lamp.

In the case of a P-channel MOS FET, it can be on/off driven by changing its gate potential in the range below a potential at its source to which a source voltage is applied. Accordingly, the rectangular wave voltage applied to the gate can be set below the source voltage, meaning that a doubler circuit such as used in the above-mentioned related art is not required. Also, the rectangular wave voltage for driving the MOS FET can be generated without using any comparators.

Further, by arranging such that the lamp is lit up automatically at the same time as when a switch is closed to illuminate a head lamp, it is possible to eliminate the need of means for lighting up a dashboard illumination lamp or the like alone and also to avoid the trouble of lighting up and off the lamp separately.

DETAILED DESCRIPTION OF PREFERRED EMBODIMENT

Hereinafter, an embodiment of the present invention will be described with reference to FIGS. 1 to 3.

Figure 1:
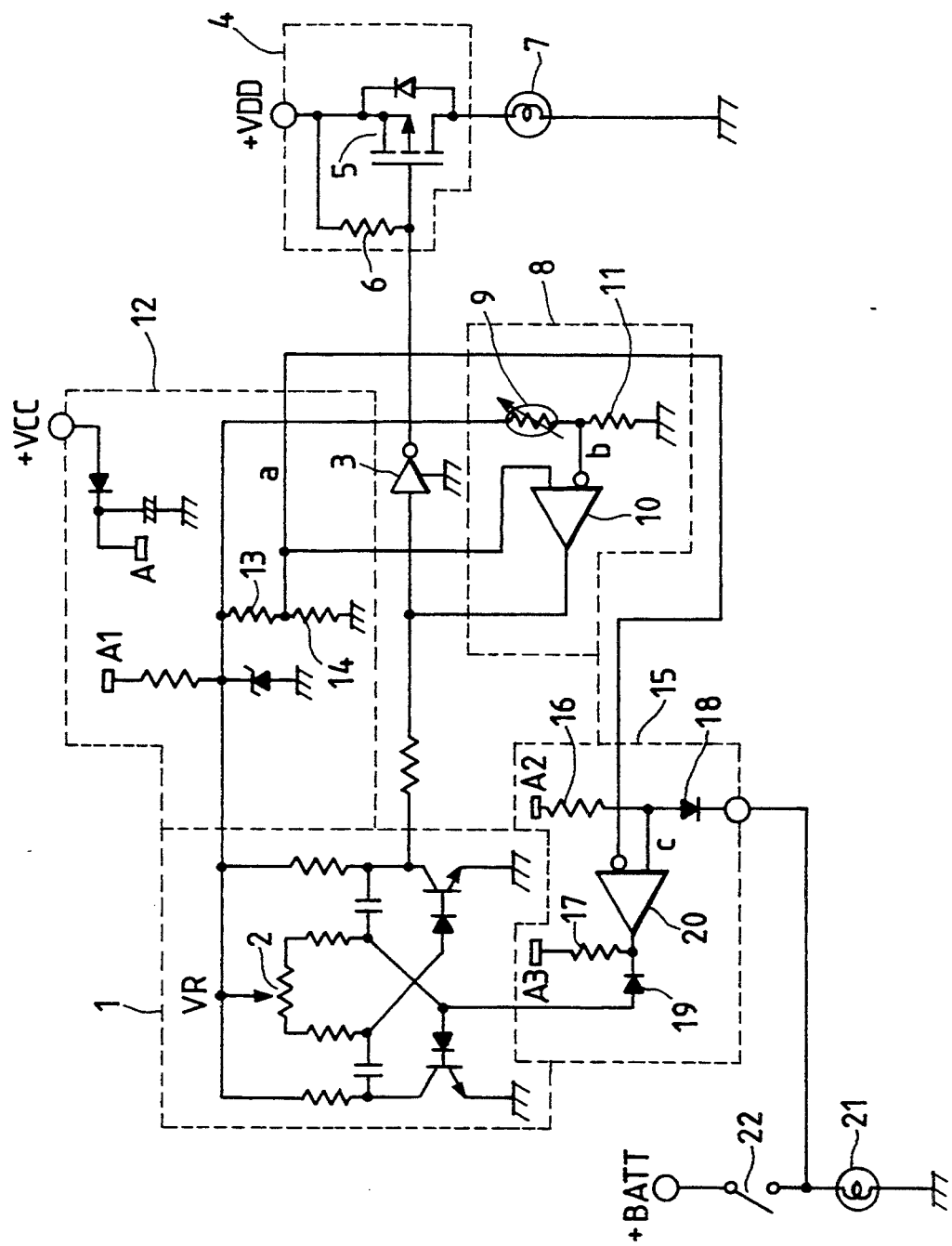
FIG. 1 is a circuit diagram showing one embodiment of a light controller for lamps according to the present invention.

As shown in FIG. 1, a light controller for lamps showing one embodiment of the present invention comprises an astable multivibrator 1 including a variable resistor 2, an inverter 3 connected to an output terminal of the multivibrator 1, a reference voltage source 12 for supplying a source power to the multivibrator 1 and including resistances 13, 14, a first driver circuit 4 connected to an output terminal of the inverter 3 and including a P-channel MOS FET 5 and a resistance 6, a lamp 7 illuminated by a current supplied from the first driver circuit 4, a protective circuit 8 consisted of a temperature sensor 9, a comparator 10 and a resistance 11, a second driver circuit 15 consisted of resistances 16, 17, diodes 18, 19 and a comparator 20, a head lamp 21 illuminated by a current supplied from the second driver circuit 15, and a switch 22.

Figure 2:
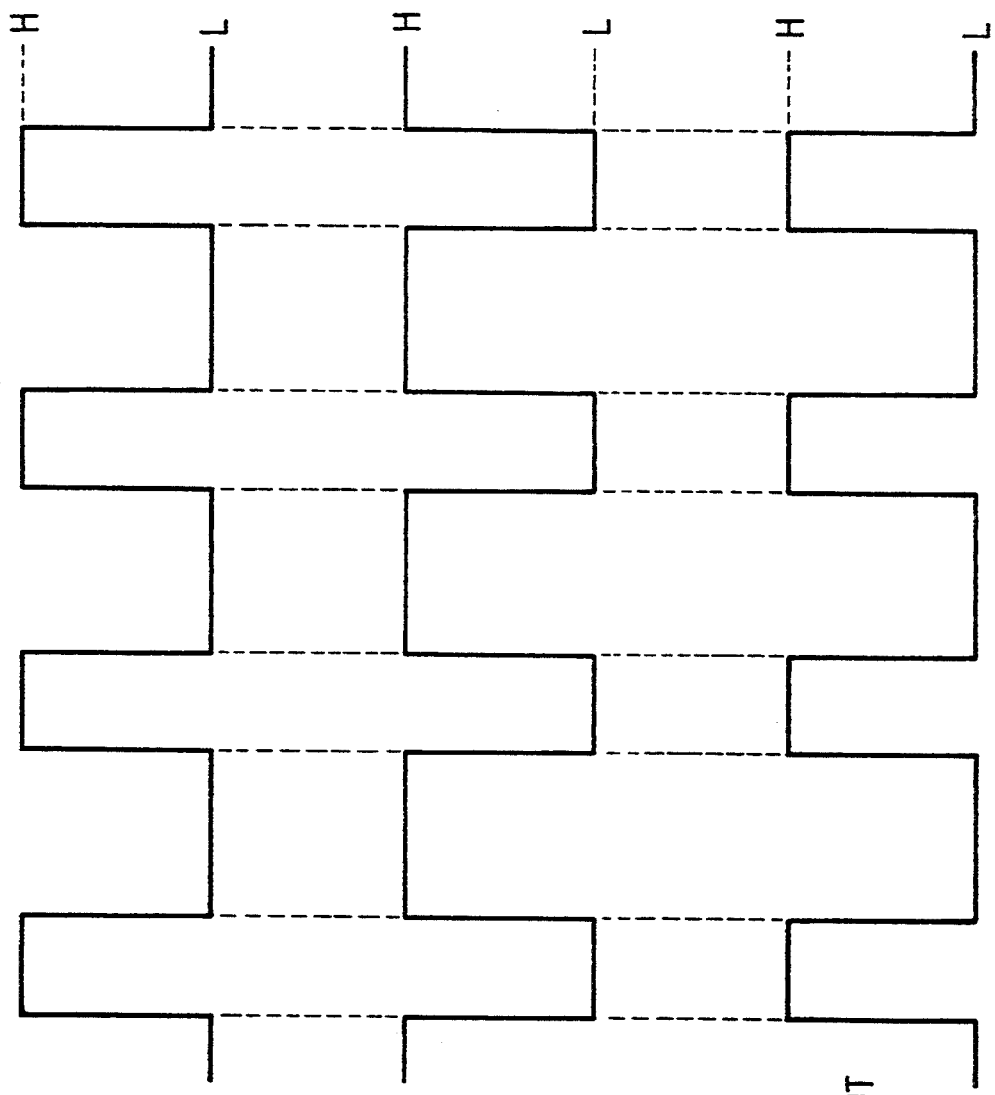
FIG. 2 (a-c) is a timing chart showing the operation of part of the light controller for lamps shown in FIG. 1.

As shown in FIG. 2, the astable multivibrator 1 outputs a rectangular wave of predetermined frequency (FIG. 2(a)) which is inverted by the inverter 3 (FIG. 2(b)) and then applied to a gate of the P-channel MOS FET 5 in the first driver circuit 4. The MOS FET 5 is turned on during an "L" period of the rectangular wave from the inverter 3 so that a current from a power source at +Vdd connected to its source is passed to the lamp 7 connected to its drain, and it is turned off during an "H" period of the rectangular wave (FIG. 2(c)). By changing a resistance value of the variable resistor 2 in the astable multivibrator 1, a cycle of the rectangular wave output from the astable multivibrator 1 and therefore an on/off cycle of the MOS FET 5 can be changed. As a result, an amount of the current flowing through the lamp 7 can be changed so as to vary the illumination intensity of the lamp 7.

In the case of a P-channel MOS FET, it can be on/off controlled by changing its gate potential in the range below a potential at its source to which a source voltage +Vdd is applied. With the above in mind, the source voltage +Vdd is applied to the gate of the MOS FET 5 through the resistance 6, voltages during "it" and "L" periods of the rectangular wave output from the inverter 3 are properly set, and further a value of the resistance 5 is properly set so that a voltage applied to the gate of the MOS FET 5 through the resistance 6 turns on the MOS FET 5 during the "L" period of the rectangular wave, but will not turn it on during the "H" period of the rectangular wave.

Thus, the MOS FET 5 can be directly turn on and off by using a rectangular wave signal which is inverted by the inverter 3 and output from the astable multivibrator 1, and hence the doubler circuit (charge pump circuit) explained before in connection with the related art can be omitted.

Also, since the rectangular wave signal for on/off driving the MOS FET 5 is generated by the astable multivibrator 1, the comparators 101, 106 explained before in connection with the related art are not required for generating the rectangular wave signal.

As a result, the controller of this embodiment does no longer need a doubler circuit and a comparator which require the larger number of parts, a more complex configuration and a larger space, making it possible to achieve a reduction in the cost and size and provide more functions.

Figure 3:
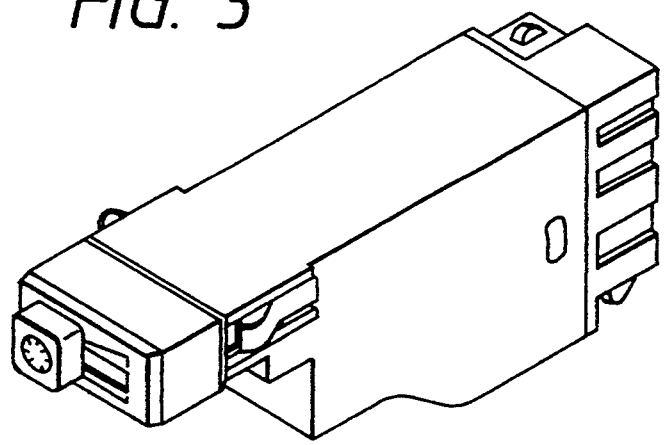
FIG. 3 is a perspective view showing an appearance of the light controller for lamps shown in FIG. 1.
Figure 4:
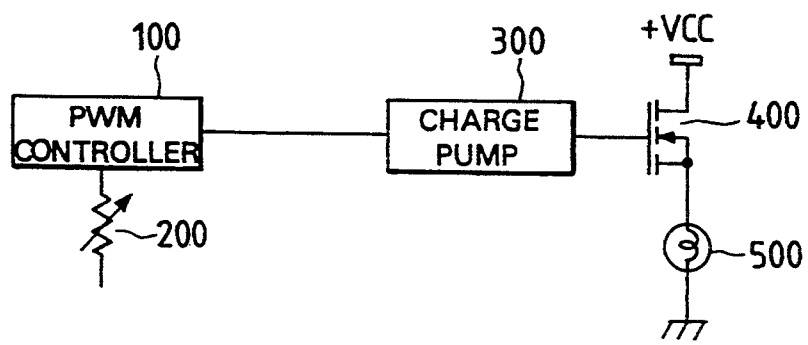
FIG. 4 is a block diagram showing one example of a prior art light controller for lamps.
Figure 5:
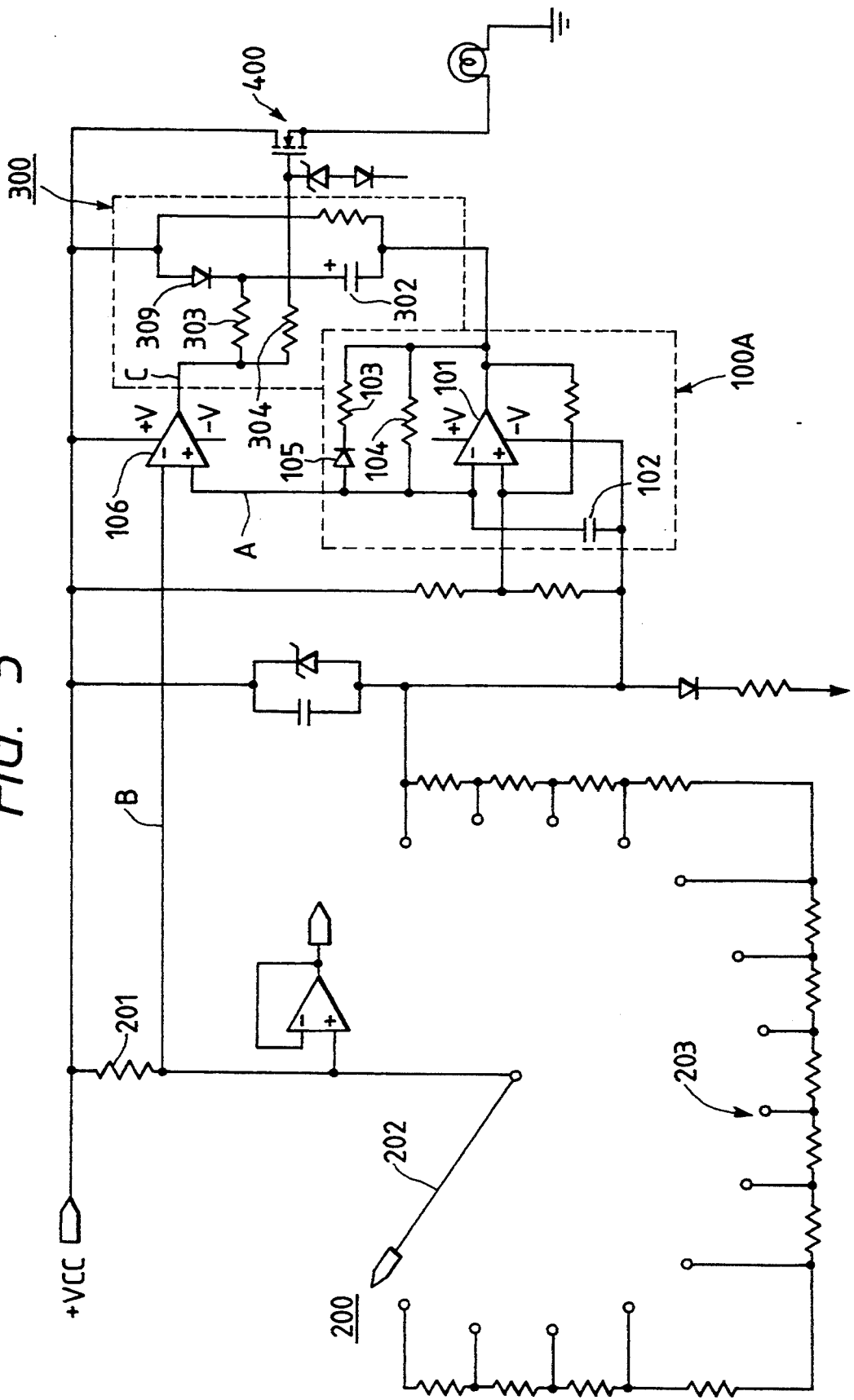
FIG. 5 is a circuit diagram showing a practical configuration of the light controller for lamps shown in FIG. 4.

FIG. 3 is a perspective view showing an appearance of the light controller of this embodiment. More specifically, FIG. 3 shows a unit for supplying source power to a panel illumination lamp adapted to an electric equipment unit (mainly attached to an internal panel) for motor vehicles.

The illustrated unit has a size comparable to a hybrid IC, meaning that the unit size can be reduced to ⅓ as compared with a similar conventional unit.

Further, since an intention of light control for lamps is achieved without using one doublet- circuit and two comparators, the unit can be produced at ½ of the conventional cost.

The protective circuit 8 serves to protect the MOS FET 5 from short-circuiting, and includes the temperature sensor 9 such as a thermistor and the comparator 10. In the reference voltage source 12, the input source voltage +Vcc is supplied via points A, A1 to the resistances 13, 14 which divide the source voltage to produce a reference voltage a. In the protective circuit 8, this reference voltage a is applied to one input of the comparator 10, whereas it is also divided by the temperature sensor 9 and the reference 11 and a resulting divided voltage b is applied to the other input of the comparator 10.

When the MOS FET 5 is normal, its temperature is low and a resistance value of the temperature sensor 9 is large, resulting in the relationship of a>b. Therefore, an output of the comparator 10 is at "H", i.e., high impedance, so that the MOS YET 5 is on/off controlled by the output of the inverter 3. In the event an abnormality such as a short circuit occurs in the MOS YET 5 and brings about the relationship of a<b as a result of its raised temperature and an increased resistance value of the temperature sensor 9, the output of the comparator 10 becomes "L" so that the MOS YET 5 is kept turned off. Accordingly, the MOS FET 5 is supplied with no currents and its temperature is lowered, whereby it is protected.

If the protective circuit is not provided, the MOS FET would be broken frequently, the trouble of replacing the broken MOS FET with new one would be necessary, and safety required for motor vehicles or the like could not be satisfied sufficiently.

The second driver circuit 15 serves to control driving and stop of the astable multivibrator 1, and comprises the resistances 16, 17, the diodes 18, 19 and the comparator 20. When an output of the comparator 20 takes "H", the diode 19 is back-biased with the source voltage +Vcc applied to a point A3 from the point A in the reference voltage source 12 and, therefore, the astable multivibrator 1 comes into an operative state. On the contrary, when the output of the comparator 20 takes "L", the diode 19 is forward-biased and the astable multivibrator 1 is stopped.

The comparator 20 is supplied as one input with the reference voltage a produced by the resistances 13, 14 in the reference voltage source 12, and as the other input with a voltage c produced at a junction between the resistance 16 and an anode of the diode 18. Further, the source voltage +Vcc is applied to the resistance 16 from the point A in the reference voltage source 12 via a point A2, and a cathode of the diode 18 is connected to a junction between the switch 22 to which a battery voltage is applied and the head lamp 21.

Assuming now that the switch 22 is turned off, the diode 18 is forward-biased and the voltage c resulted from the source voltage +Vcc having dropped through the resistance 16 is supplied to the comparator 20, giving rise to the relationship of a>c. Accordingly, an output of the comparator 20 takes "L" and the astable multivibrator 1 is kept stopped. When the switch 22 is turned on, the head lamp 21 is lit up while the diode 18 is back-biased and the voltage c becomes almost equal to the source voltage+Vcc, giving rise to the relationship of a<c. Accordingly, the output of the comparator 20 takes "H" and the astable multivibrator 1 is operated.

Thus, the lamp 7 can be lit up automatically at the same time as when the switch 22 is closed to illuminate the head lamp 21. As a result, it is possible to eliminate the need of means for lighting up a dashboard illumination lamp or the like alone and also to avoid the trouble of lighting up and off the lamp separately.

According to the present invention, as described above, a light controller for lamps is obtained which can remarkably reduce the number of parts, cost and size.

Also, according to the present invention, a light controller for lamps is obtained which operates reliably and safely.

Further, according to the present invention, a light controller for lamps is obtained which does not require switch means for lighting up and off a dashboard illumination lamp or the like and hence can obviate a specific operation necessary for lighting up and off the lamp.

What is claimed is:

1. A light controller for lamps comprising:
   a multivibrator for generating rectangular wave voltage signal;
   an inverter having an input terminal connected to the multivibrator for inverting the rectangular wave voltage signal output from said multivibrator;
   a P-channel MOS FET having a gate connected to receive the inverted rectangular wave voltage signal output from said inverter; and
   a protective circuit connected to the gate of said MOS FET for protecting said MOS FET against an overload current;
   wherein said MOS FET includes a source connected to a source voltage and a drain connected to a lamp; and
   wherein said protective circuit includes a comparator having an output terminal connected the input terminal of the inverter and a temperature sensor connected to an input terminal of said comparator.

2. A light controller for lamps comprising:
   a multivibrator for generating a rectangular wave voltage signal on an output terminal;
   a P-channel MOS FET having a gate connected to output terminal of the multivibrator, a source connected to a source voltage, and a drain connected to a lamp; and
   a driver circuit connected to the output terminal of said multivibrator;
   wherein said MOS FET is controlled by said rectangular wave voltage; and
   wherein said driver circuit comprises:
   resistance elements each connected to a reference voltage source,
   a comparator having an input terminal to which one of said resistance elements is connected, and an output terminal to which the other of said resistance elements is connected,
   a first diode forward-connected between an output terminal of said multivibrator and the input terminal of said comparator, and
   a second diode forward-connected to the output terminal of said comparator.

3. A light controller according to claim 1,
   wherein a second input terminal of the comparator is connected to receive a reference voltage;
   wherein the temperature sensor is located adjacent the MOS FET such that heating of the MOS FET due to an overload current is detected by the temperature sensor; and
   wherein the comparator prevents transmission of the inverted rectangular voltage signal in response to a detected overload current.

4. A light controller according to claim 3, wherein the temperature sensor is a thermistor whose resistance is determined by a temperature of the MOS FET.

5. A light controller according to claim 2, further comprising a protective circuit connected between the output terminal of the multivibrator and the gate of said MOS FET;
   wherein said protective circuit includes a second comparator having an output terminal connected the input terminal of the inverter and a temperature sensor connected to an input terminal of said second comparator.

6. A light controller according to claim 5,
   wherein a second input terminal of the second comparator is connected to receive a reference voltage;
   wherein the temperature sensor is located adjacent the MOS FET such that heating of the MOS FET due to an overload current is detected by the temperature sensor; and
   wherein the second comparator prevents transmission of the inverted rectangular voltage signal in response to a detected overload current.

7. A light controller according to claim 6, wherein the temperature sensor is a thermistor whose resistance is determined by a temperature of the MOS FET.

* * * * *